M. C. COX.
Cultivator.
No. 96,399. Patented Nov. 2, 1869.
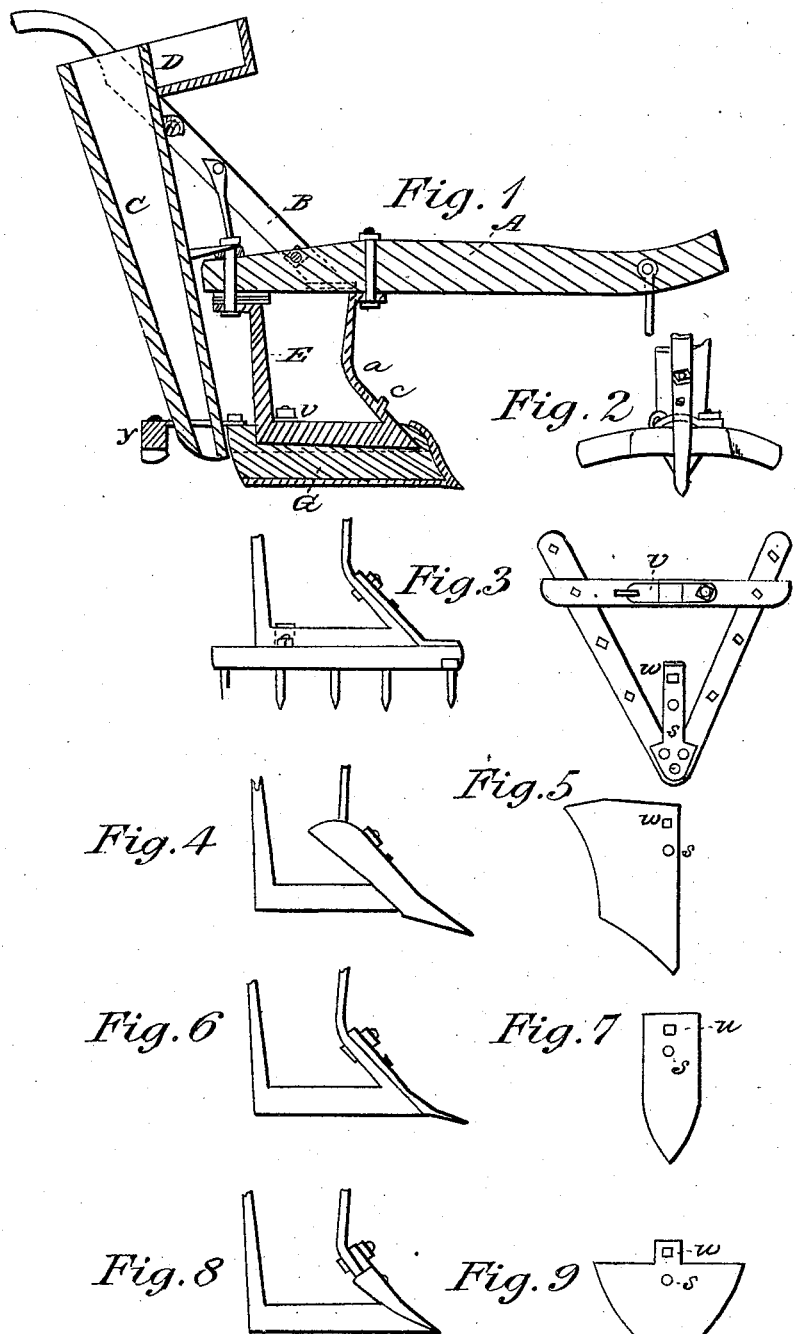

UNITED STATES PATENT OFFICE.

MICHAEL C. COX, OF BENNETTSVILLE, SOUTH CAROLINA.

IMPROVEMENT IN PLOWS.

Specification forming part of Letters Patent No. 96,399, dated November 2, 1869.

*To all whom it may concern:*

Be it known that I, MICHAEL C. COX, of Bennettsville, in the county of Marlborough and State of South Carolina, have invented a new and valuable Improvement in Plows; and I do hereby declare that the following is a full, clear, and exact description of the construction and operation of the same, reference being had to the annexed drawings, making a part of this specification, and to the letters and figures of reference marked thereon.

Figure 1 of the drawings is a plan view of my invention. Figs. 2, 3, 4, 5, 6, 7, 8, and 9 are details.

My invention relates to plows; and it consists, mainly, in a novel arrangement of devices intended to serve the purposes of a plow, a guano-sower, corn planter and coverer, a harrow, cotton-drill, and a rice-planter.

The letter A of the drawings represents the beam of my plow, and the letter B the handles thereof.

The letter C represents a tube or funnel arranged between the plow-handles, and attached to the beam in the manner shown.

The letter D represents a box arranged between the plow-handles, and intended to hold guano or other fertilizer, or seeds for sowing. This funnel and box are usually constructed of zinc metal, and are made removable at will by removing the nut upon the rear end of the plow-beam.

The letter E represents a frame attached by bolts and screws to the plow-beam, and which is intended to serve as means of attachment for the various devices set forth in the detail figures, as well as for the block G, connected therewith, on Fig. 1.

My method of attachment is as follows, namely: I make an opening in the front bar of the frame, as shown at *a*, and also attach a small pin thereto, as shown at *c* on Fig. 1. This pin *c* is adapted to receive the detailed devices through their openings *s*, and I pass a bolt, with nut and screw, through the opening *a* of the frame and the opening *u* of the detail.

For attaching the block G and the harrow, Fig. 5, I attach a hinged strap to the block and harrow, respectively, as shown at *v*, and pass a bolt, with nut and screw-head, through said block and harrow, thereby securing said strap firmly above the longitudinal bar of the frame.

It will readily be perceived that by the means above described either of the devices shown upon the detail figures, as well as the block G, is made removable and attachable at will.

The letter *y* represents a curved bar attached to the rear of the block G, as shown, which serves as a support for the plow and a coverer for the seed being planted or the fertilizer being sown.

The seed or fertilizer is passed by hand from the box D into the funnel C, which conducts it to the ground.

What I claim as my invention, and desire to secure by Letters Patent, is—

The convertible plow, harrow, guano and seed sower, and planter, having frame E, block G, plows and harrows, Figs. 3, 4, 5, 6, 7, 8, and 9, funnel C, and box D, with bolts, openings, and straps, as described, constructed and arranged substantially as specified.

In testimony that I claim the above I have hereunto subscribed my name in the presence of two witnesses.

MICHAEL C. COX.

Witnesses:
   T. E. DUDLEY,
   P. M. COLE.